United States Patent
Yamanaka et al.

(10) Patent No.: US 7,616,353 B2
(45) Date of Patent: Nov. 10, 2009

(54) IMAGE READING UNIT AND IMAGE FORMING APPARATUS COMPRISING THE SAME

(75) Inventors: Yuji Yamanaka, Toride (JP); Takuya Terae, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 11/003,526

(22) Filed: Dec. 6, 2004

(65) Prior Publication Data
US 2005/0128536 A1     Jun. 16, 2005

(30) Foreign Application Priority Data
Dec. 16, 2003 (JP) ............... 2003-417606

(51) Int. Cl.
*H04N 1/04* (2006.01)
(52) U.S. Cl. .............. 358/474; 358/471; 358/496; 358/493
(58) Field of Classification Search ......... 358/474, 358/471, 400, 496, 493, 487; 382/312
See application file for complete search history.

(56) References Cited

U.S. PATENT DOCUMENTS

| | | | | |
|---|---|---|---|---|
| 5,365,321 | A | 11/1994 | Koshimizu et al. | 355/285 |
| 6,131,898 | A | 10/2000 | Hiroi et al. | 271/10.03 |
| 6,349,155 | B1 * | 2/2002 | Youda et al. | 382/312 |
| 6,671,491 | B1 | 12/2003 | Yamanaka et al. | 399/407 |
| 7,202,983 | B2 * | 4/2007 | Yokota et al. | 358/496 |
| 2002/0001105 | A1 * | 1/2002 | Takaki et al. | 358/474 |
| 2002/0086786 | A1 | 7/2002 | Kamizuru et al. | 493/405 |
| 2003/0117673 | A1 | 6/2003 | Yamanaka | 358/498 |
| 2005/0025541 | A1 | 2/2005 | Terae et al. | 399/380 |
| 2005/0128536 | A1 | 6/2005 | Yamanaka et al. | 358/488 |
| 2005/0157357 | A1 | 7/2005 | Yamanaka | 358/498 |

FOREIGN PATENT DOCUMENTS

| | | |
|---|---|---|
| JP | 08-6177 | 1/1996 |
| JP | 10-112771 | 4/1998 |
| JP | 2001-083749 | 3/2001 |
| JP | 2003-241328 | 8/2003 |
| JP | 2003-333277 | 11/2003 |

* cited by examiner

*Primary Examiner*—Houshang Safaipour
(74) *Attorney, Agent, or Firm*—Fitzpatrick, Cella, Harper & Scinto

(57) ABSTRACT

The representative configuration of an image reading unit according to the present invention and an image forming apparatus comprising the same is an image reading unit comprising a document feeding unit, a lamp and a mirror for reading out the image on a document, a flow reading platen provided between the document feeding unit, and the lamp and the mirror for guiding the document while sliding the same against the surface, and an aluminum sheet for grounding the flow reading platen, wherein the aluminum sheet is conductive with the flow reading platen on the document feeding direction upstream side with respect to the document reading position for reading the image in the substantially entire document width by the lamp and the mirror.

10 Claims, 12 Drawing Sheets

FIG.4
(a)
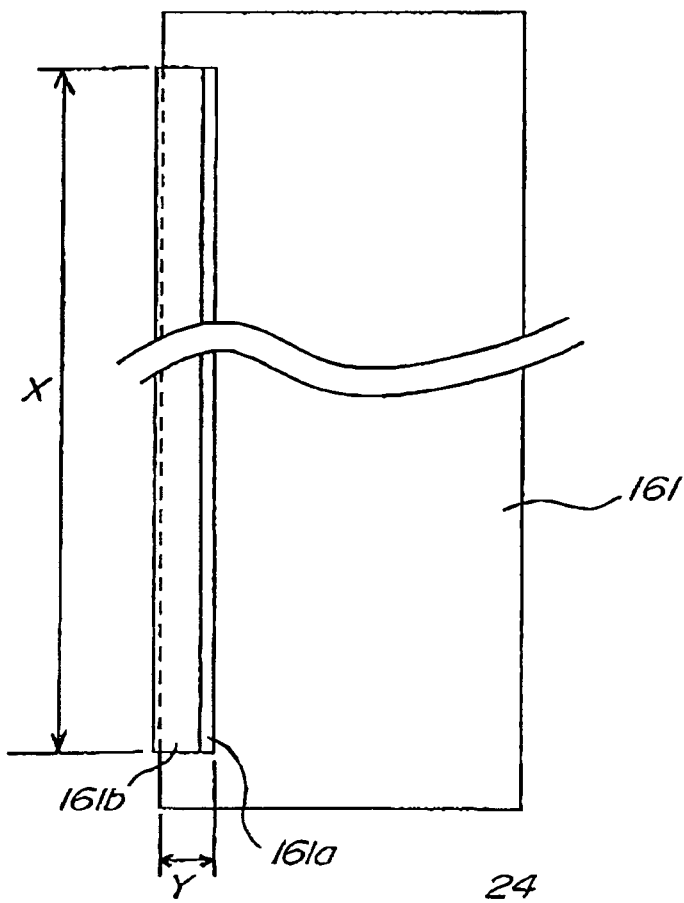
(b)
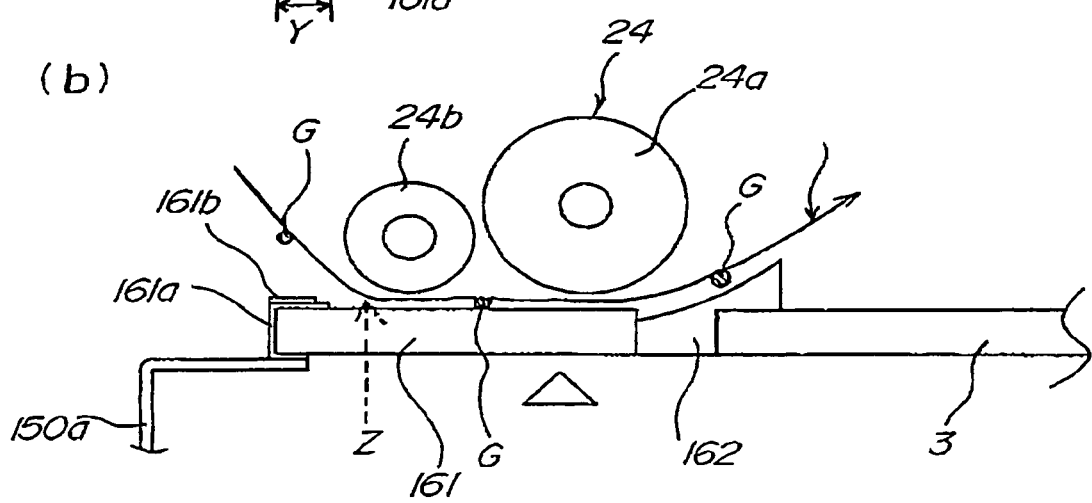

FIG.11
(a)
(b)
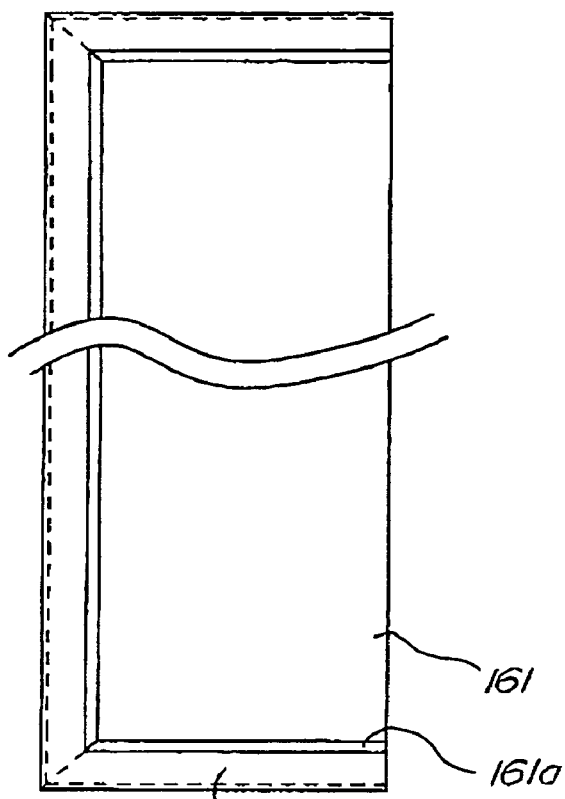
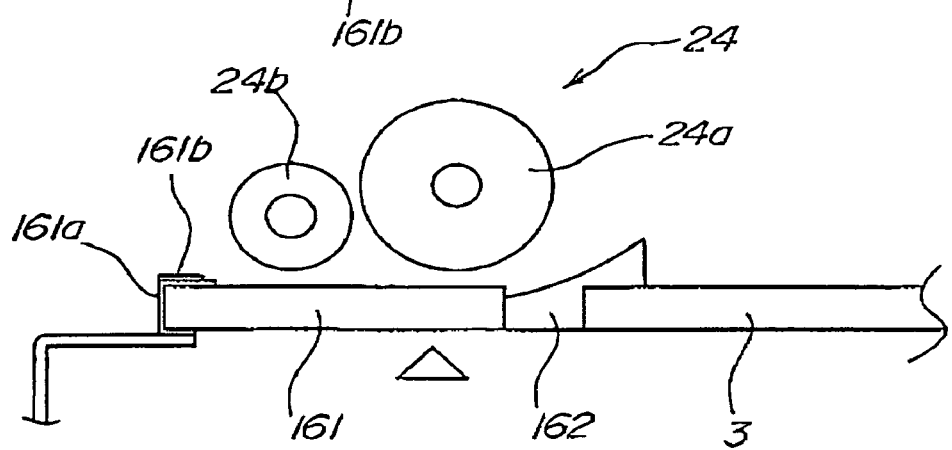

IMAGE READING UNIT AND IMAGE FORMING APPARATUS COMPRISING THE SAME

BACKGROUND OF THE INVENETION

1. Field of the Invention

The present invention relates to an image reading unit for reading out an image on a sheet material (document) comprising a document feeding unit for automatically feeding the sheet material (document) with the image recorded, used for a scanner, a copying machine, a printer, a facsimile equipment, or the like, and an image forming apparatus comprising the same.

2. Description of the Related Art

Conventionally, there is an image reading unit comprising a document feeding unit (hereinafter, it is referred to as the ADF (auto document feeder)) such as a double side compatible automatic document feeding unit used for an image forming apparatus such as a digital copying machine. According to the image reading unit used for the digital copying machine comprising an ADF of this kind, in the case where of copying a document in the ADF, reading means is moved to a set position provided below the ADF by a motor, that is, to a position substantially immediately below a platen roller in the ADF. Then, a light beam is outputted form a lamp unit so that a document is scanned while feeding the document between the platen roller and a glass plate and the reflected light beam is detected by reading means. Then, by processing in a printer part based on the detected data, a copied image can be obtained.

As shown in FIG. 12, the document reading part of the ADF of the conventional digital copying machine comprises a platen roller 524 and a document glass 516 as a transparent document guide such that a document P is fed while sliding on the surface of the document glass 516.

Moreover, in order to ensure the feeding property of the document P, there is one for preventing charging of the document glass 516 by providing an earth spring (not shown) in the document glass 516 longitudinal direction (document width direction) end part as shown in, for example, FIG. 1 of the official gazette of the Japanese Patent Application Laid Open (JP-A) No. 2001-83749.

In the conventional example, a problem is involved in that dusts such as toner particles, paper dusts, and rubber dusts occurred by the document feeding operation are stagnated on the document glass. In particular, in the case where the dusts are stagnated at the document reading position, a problem arises in that a stripe image is occurred at the time of recording an image.

That is, as shown in FIG. 12, the dusts conveyed with the document P are slid between the document P and the document glass 51. Thereafter, although the document P is detached from the document glass 516 so as to be fed along the feeding guide 517, the dusts G are attached electrostatically on the document glass 516 so as to be stagnated. At the time, if the dusts G happen to be at the document reading position, they are read out continuously by the reading means during the reading operation so as to occur the image stripes.

Moreover, since the conventional earth spring is provided in the document glass 516 longitudinal direction (document width direction) end part so that the distance between the static electricity generating area and the earth spring is long and the total resistance value is large, a sufficient antistatic effect cannot be obtained, and thus electrostatic attachment of the dusts G onto the document glass 516 cannot be prevented.

Moreover, according to the conventional earth spring, although charge of the document glass 516 can be eliminated, the charge of the document charged by the friction cannot be eliminated.

SUMMARY OF THE INVENTION

Accordingly, an object of the present invention is to provide an image reading unit capable of preventing stagnation of dusts on a document glass so as to prevent occurrence of image stripes and an image forming apparatus comprising the same.

In order to solve the problems, the representative configuration of an image reading unit according to the present invention and an image forming apparatus comprising the same is an image reading device for reading an image of a document, a document feeding device for feeding the document to the image reading device, a transparent document guide provided between the image reading device and the document feeding device for guiding the document while sliding the same against the surface, and a conductive member for grounding the transparent document guide, wherein the conductive member is conductive with the transparent document guide on the document feeding direction upstream side with respect to the document reading position for reading the image in the substantially entire document width by the image reading device.

Moreover, the representative configuration of the image reading unit comprises a document feeding device for feeding a document, a transparent document guide for guiding the document fed by the document feeding device, an image reading device for reading the image on the document via the transparent document guide, and a conductive member for eliminating the charge of the transparent document guide, wherein the conductive member has a length same as or longer than the maximum document width to be read, and is conductive with the transparent document guide.

Moreover, the representative configuration of an image reading unit comprises a document feeding device for feeding a document, a transparent document guide for guiding the document fed by the document feeding device, an image reading device for reading the image on the document via the transparent document guide, a conductive member for eliminating the charge of the transparent document guide, and a protection member for protecting the conductive member.

The other objects and characteristics of the present invention will be made apparent by the following specification and drawings.

BRIEF DESCRIPTION OF THE DRAWINGS

FIGS. 4(a) and (b) are detailed diagrams of a document reading part.

FIGS. 11(a) and (b) are detailed diagrams of an image reading unit according to another embodiment.

DESCRIPTION OF THE PREFERRED EMBODIMENTS

First Embodiment

Figure 1:
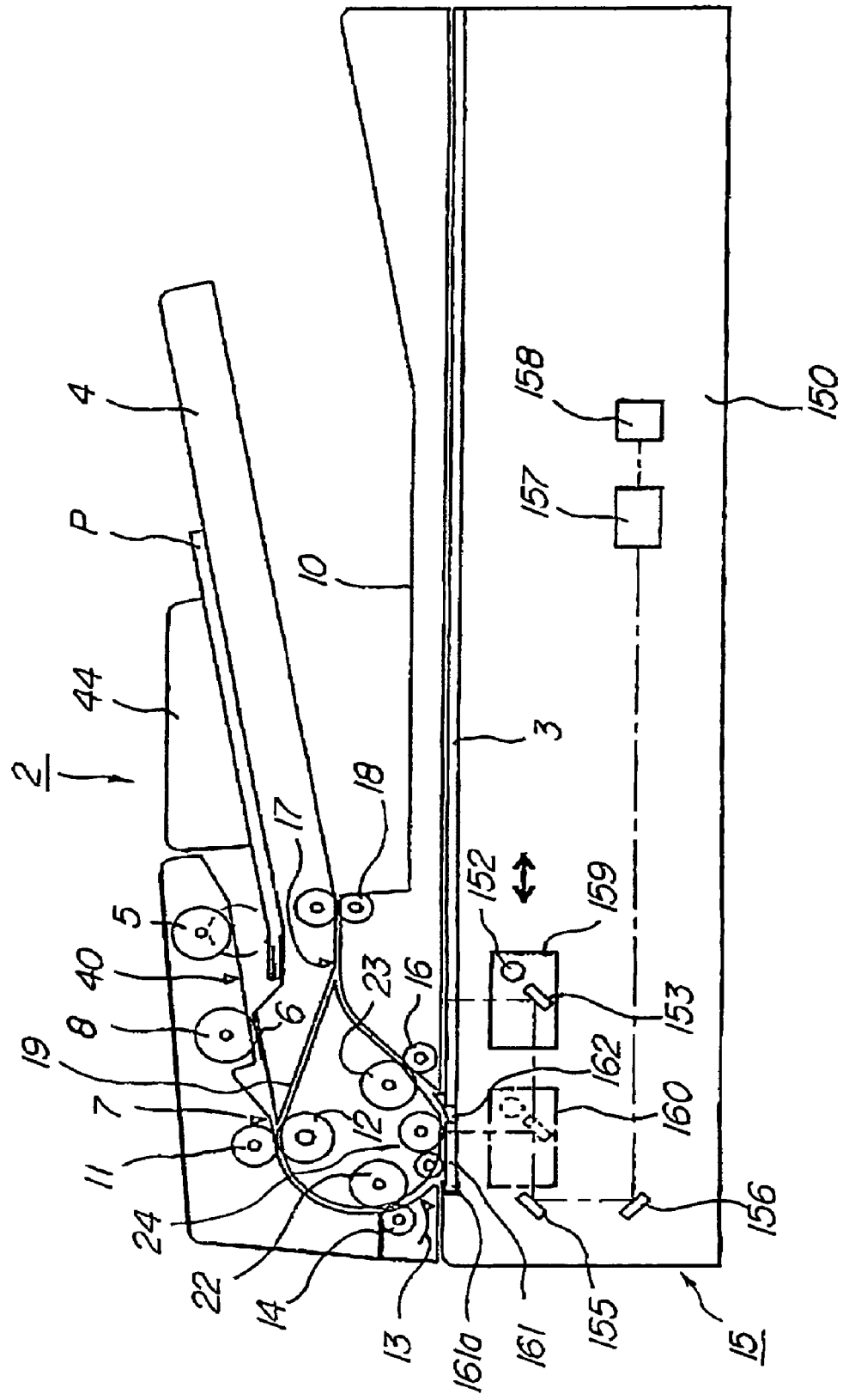
FIG. 1 is a cross sectional view of an image reading unit according to an embodiment.
Figure 2:
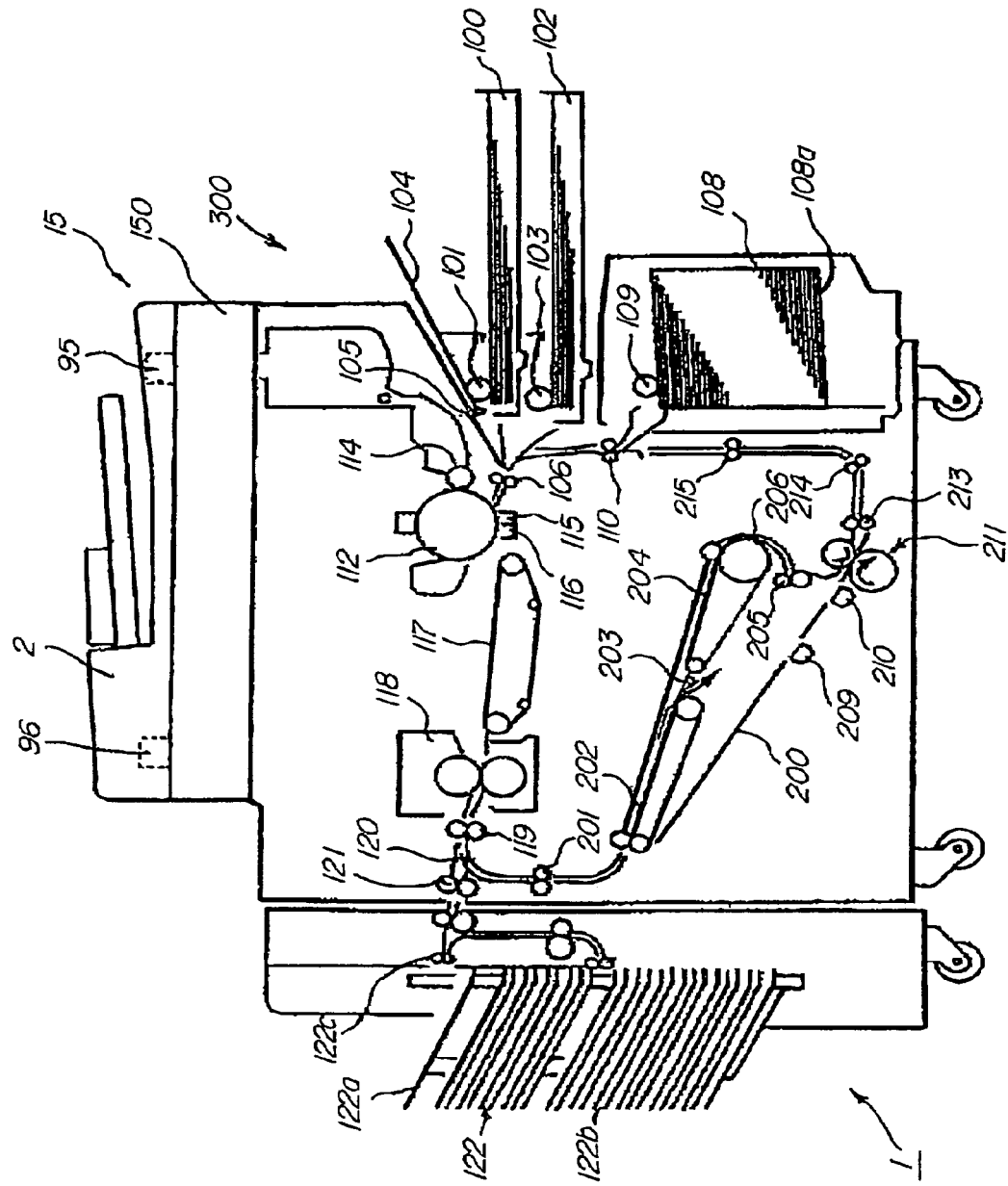
FIG. 2 is a configuration diagram of an image forming apparatus.
Figure 3:
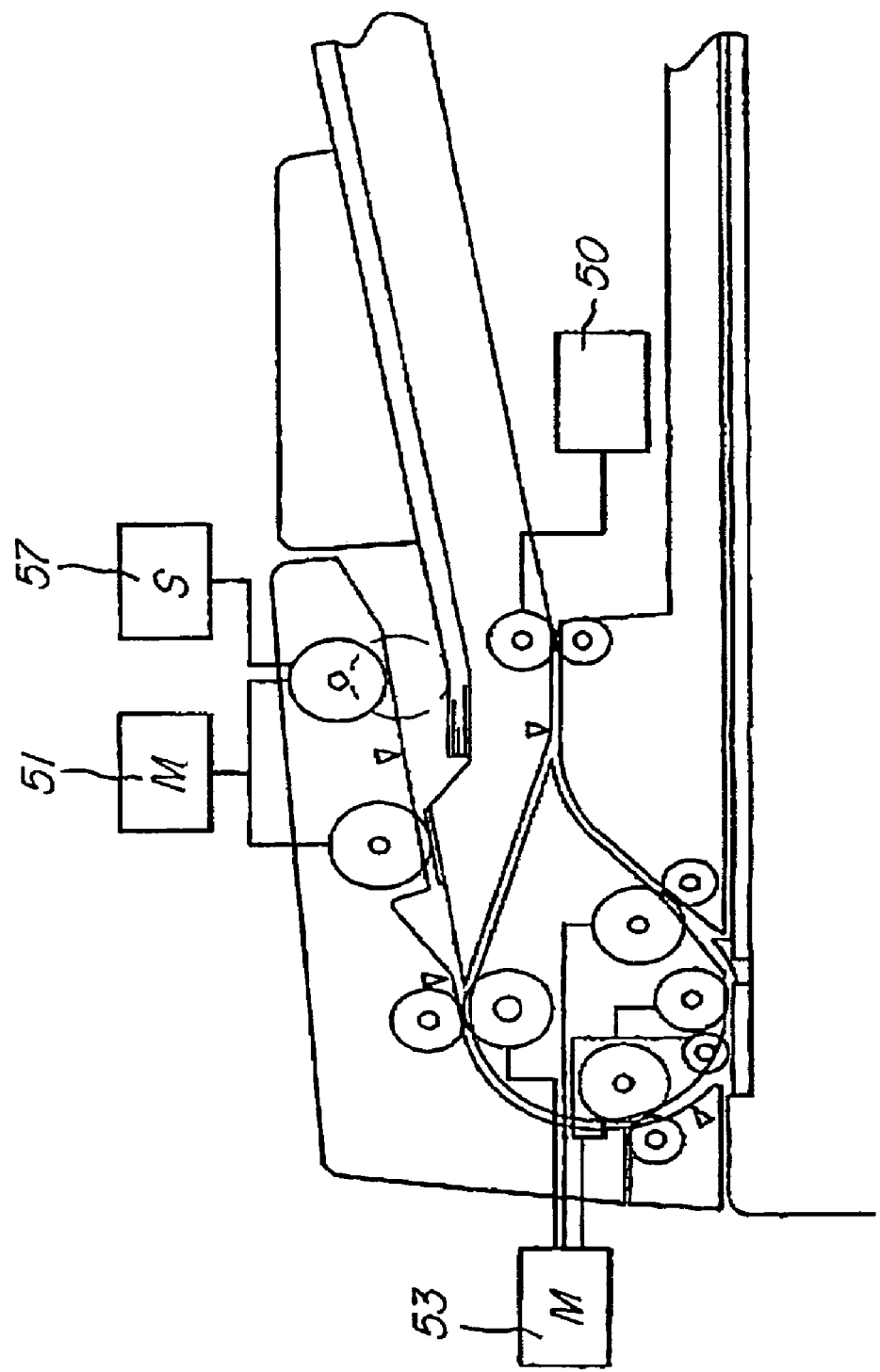
FIG. 3 is an explanatory diagram of a driving system of a document feeding unit.
Figure 5:
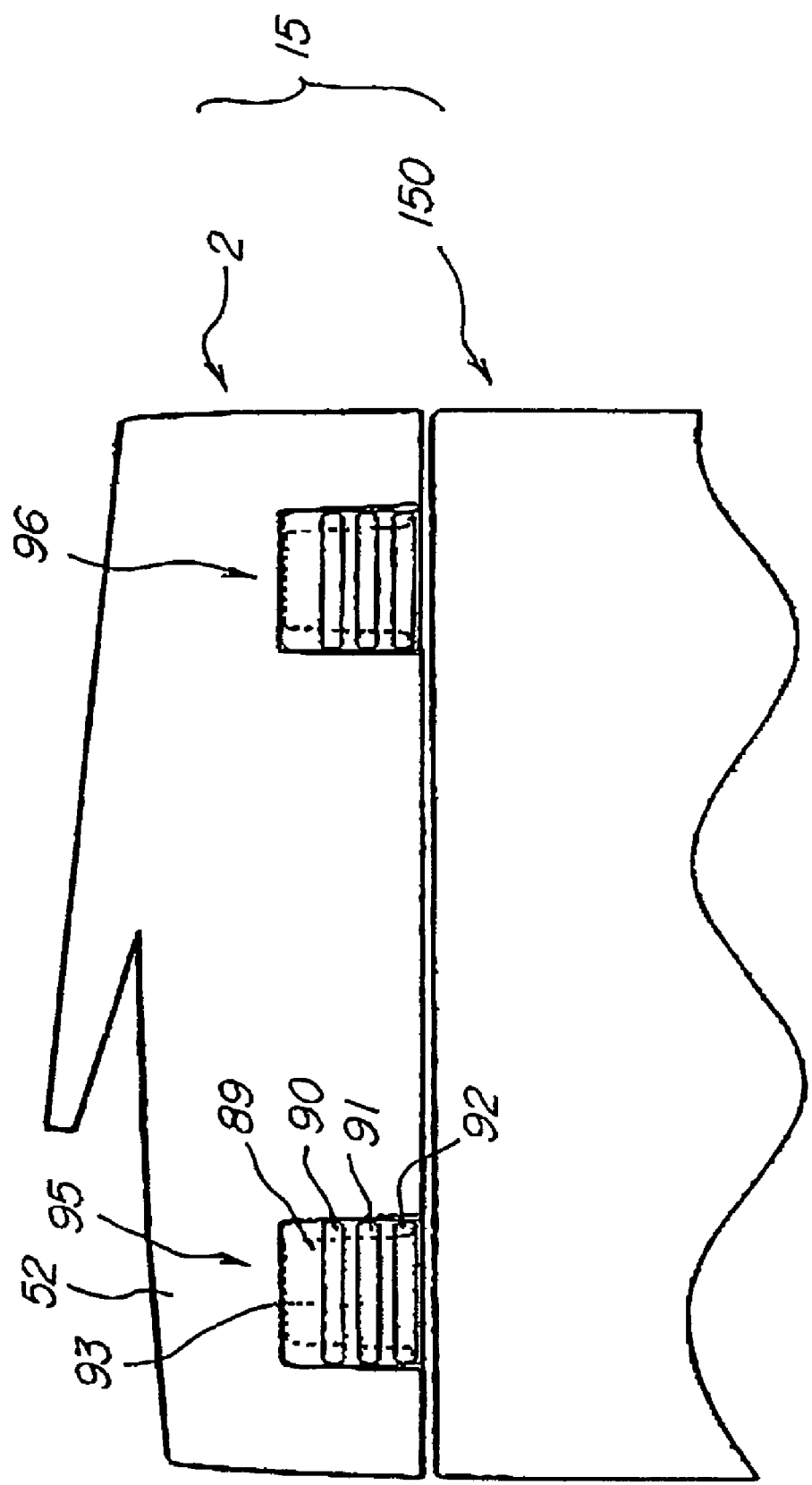
FIG. 5 is a rear view of a document feeding unit for explaining the hinge mechanism.
Figure 6:
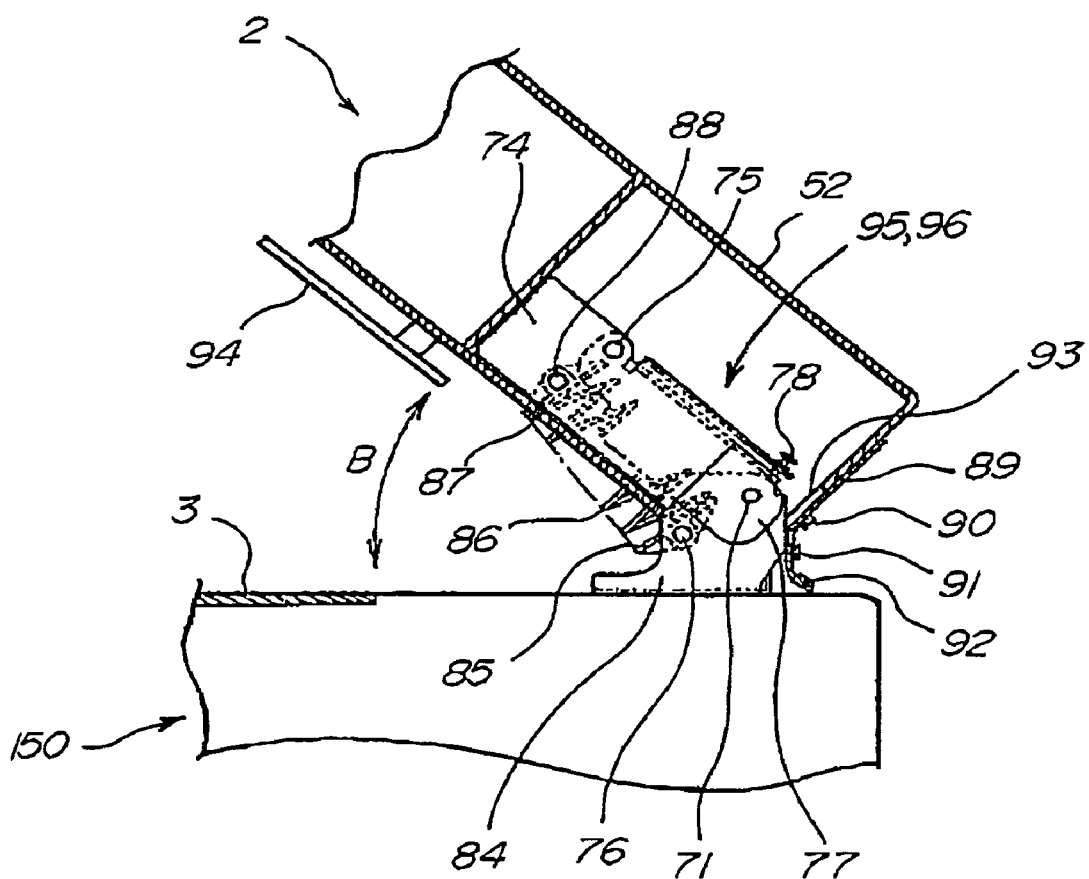
FIG. 6 is an explanatory diagram of a hinge mechanism of a document feeding unit.
Figure 7:
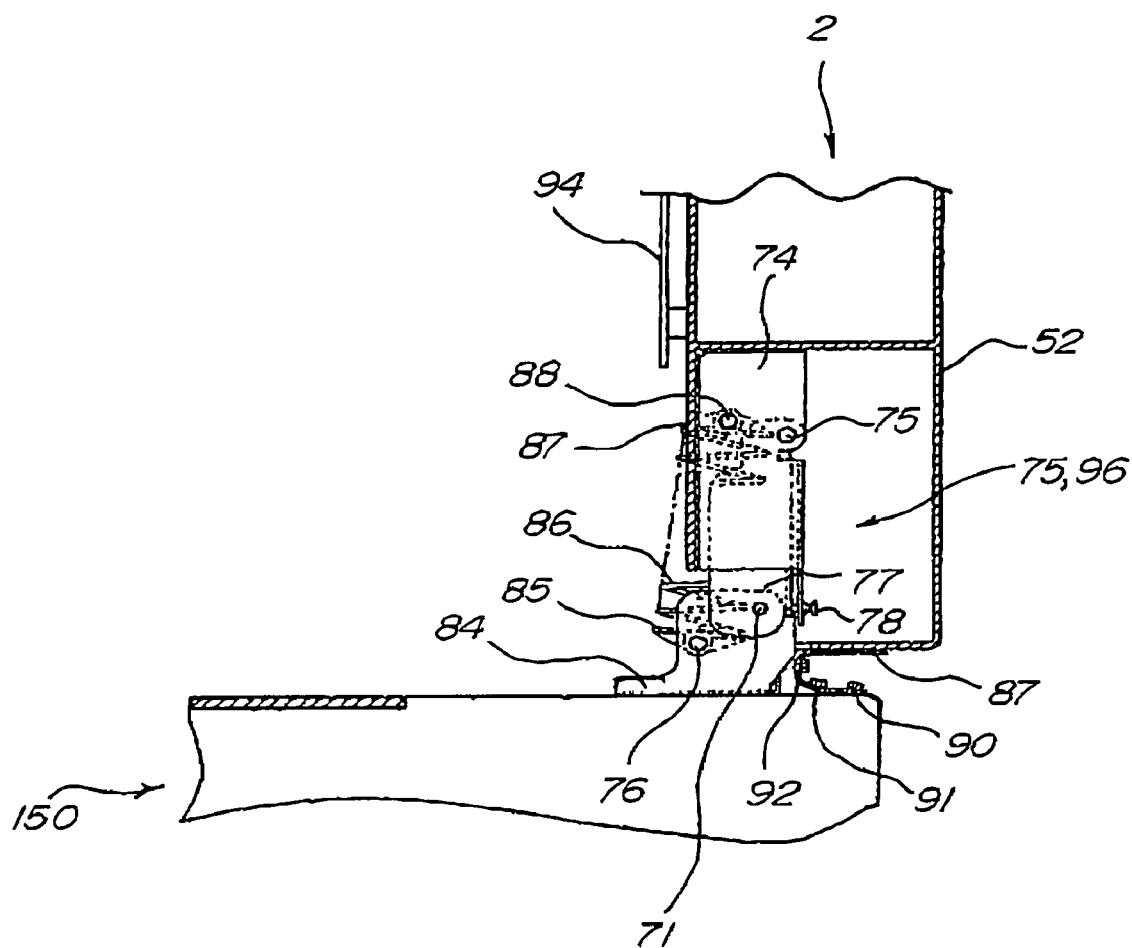
FIG. 7 is an explanatory diagram of a hinge mechanism of a document feeding unit.
Figure 8:
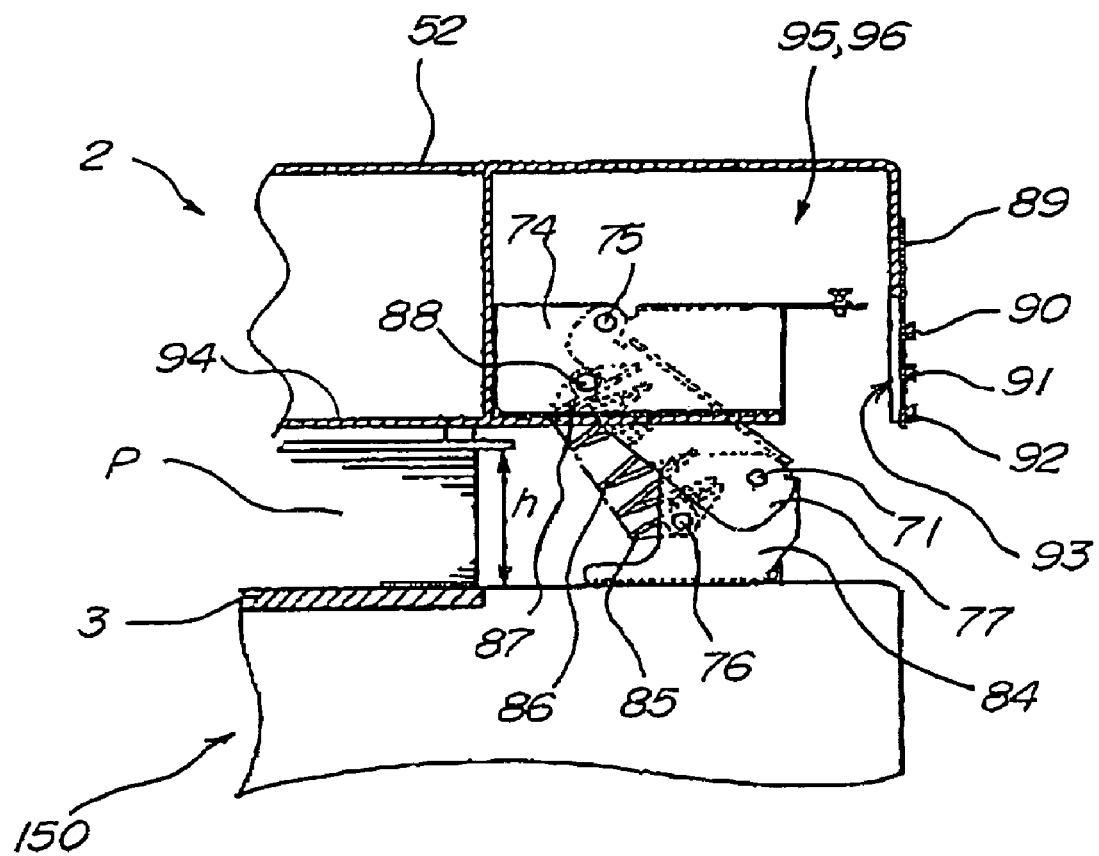
FIG. 8 is an explanatory diagram of a hinge mechanism of a document feeding unit.
Figure 9:
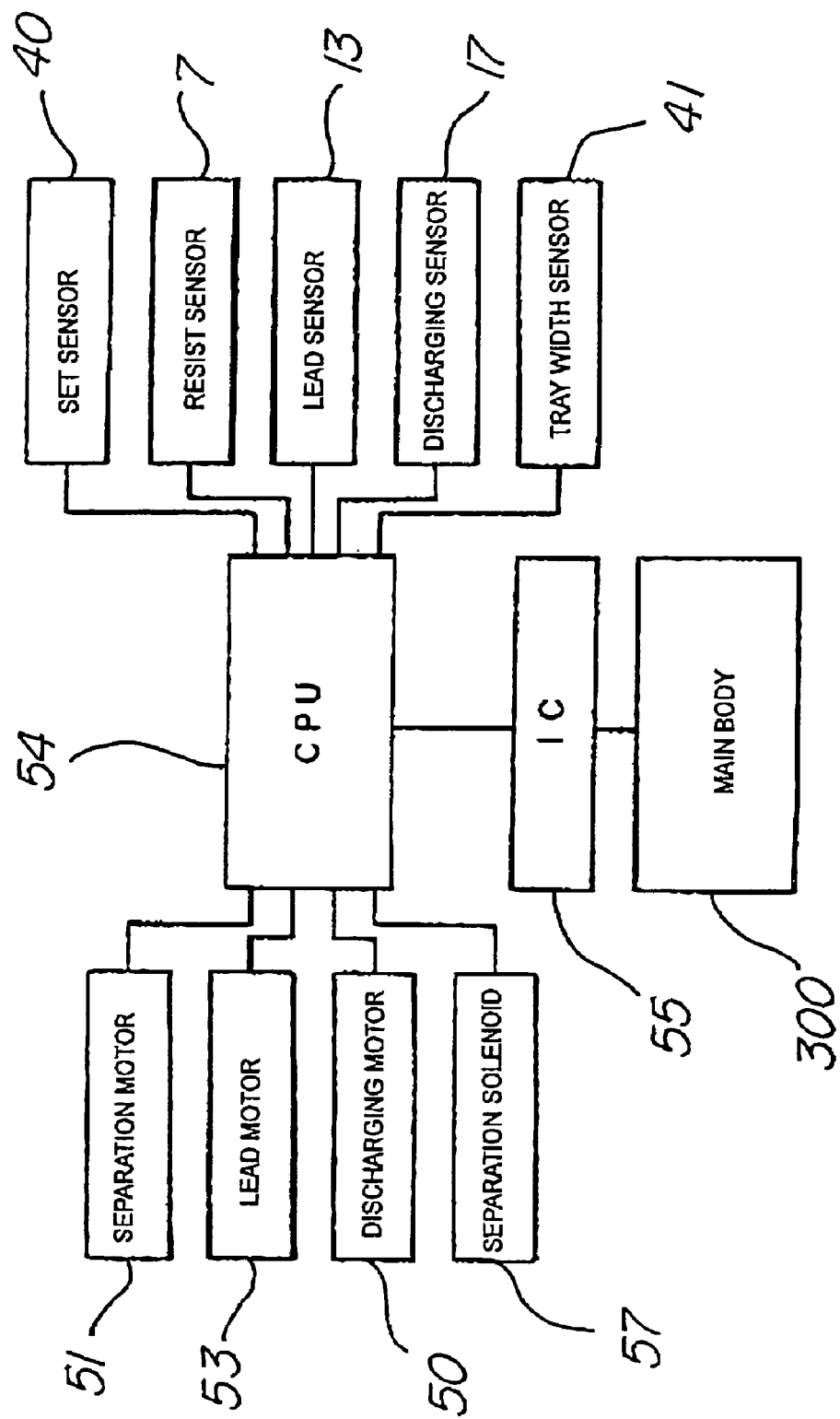
FIG. 9 is a control block diagram of a document feeding unit.
Figure 10:
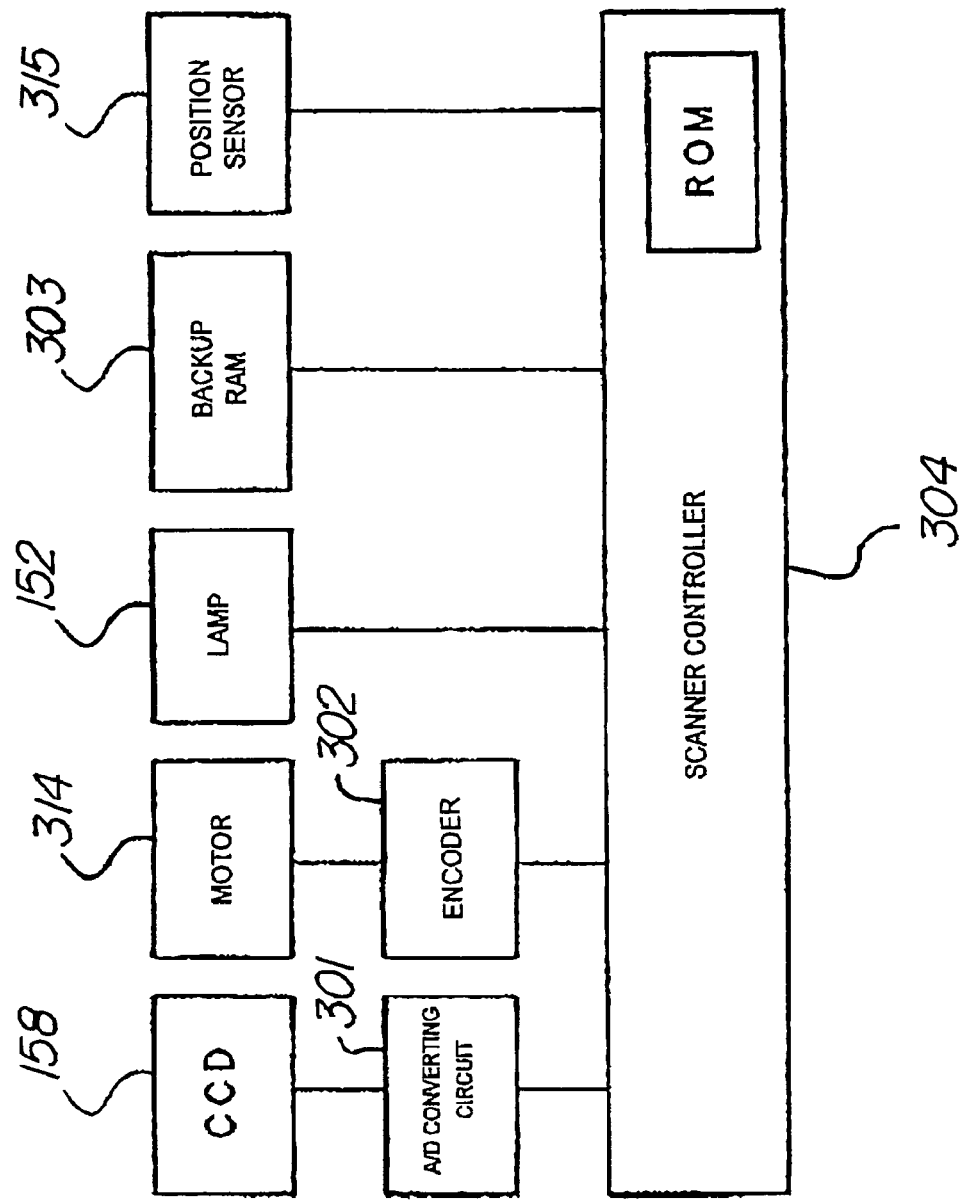
FIG. 10 is a control block diagram of a reading unit.
Figure 12:
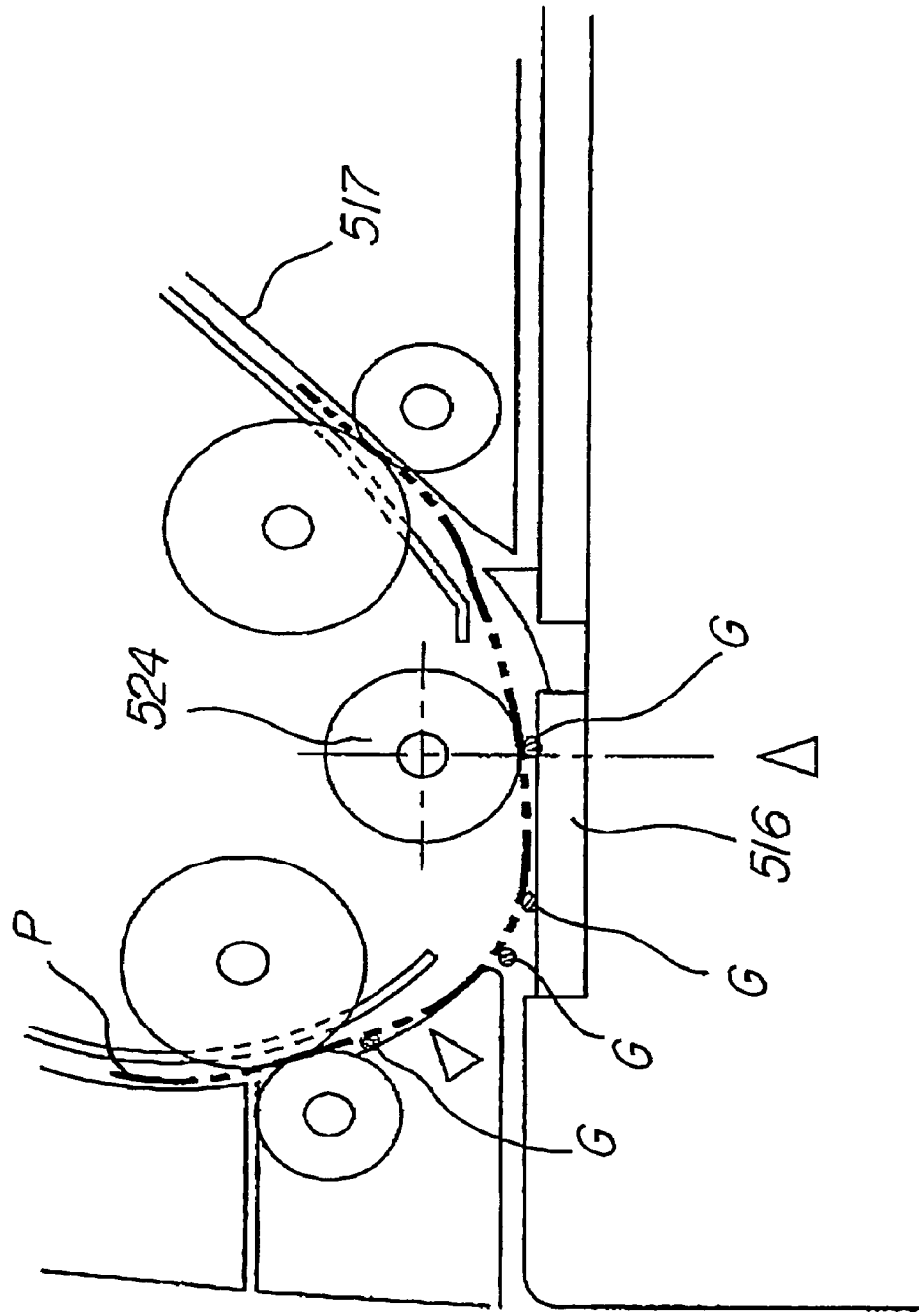
FIG. 12 is a detailed diagram of a conventional image reading unit.

A first embodiment of an image reading unit according to the present invention and an image forming apparatus comprising the same will be explained with reference to the drawings. FIG. 1 is a cross sectional view of an image reading unit according to this embodiment. FIG. 2 is a configuration diagram of an image forming apparatus. FIG. 3 is an explanatory diagram of a driving system of a document feeding unit. FIG. 4 is a detailed diagram of a document reading part. FIG. 5 is a rear view of a document feeding unit for explaining the hinge mechanism. FIGS. 6 to 8 are an explanatory diagram of a hinge mechanism of a document feeding unit. FIG. 9 is a control block diagram of a document feeding unit. FIG. 10 is a control block diagram of a reading unit.

As shown in FIG. 2, the image forming apparatus 1 comprises a printer part 300 and an image reading unit 15.

(Explanation of the Printer Part)

The printer part 300 is an image forming apparatus main body using known electrostatic latent image formation. The printer part 300 comprises a feeding part, an image forming part, a fixing unit 118 and a sorter 122.

The feeding part comprises an upper cassette 100, a lower cassette 102, a manual feeding guide 104, a sheet piling unit 108, feeding rollers 101, 103, 105, 109, and a resist roller 106.

The upper cassette 100 is for piling and storing sheets as a recording medium. The sheets stored in the upper cassette 100 are separated and fed one by one by the function of a separating nail and a feeding roller 101 so as to be guided to the resist roller 106. The lower cassette 102 is for piling and storing sheets. The sheets stored in the lower cassette 102 are separated and fed one by one by the function of a separating nail and a feeding roller 103 so as to be guided to the resist roller 106.

The manual feeding guide 104 is for piling sheets. The sheets piled on the manual feeding guide 104 are guided one by one to the resist roller 106 via the feeding roller 105.

The sheet piling unit 108 (deck type) comprises a middle plate 108a to be elevated by a motor, or the like. The sheets piled on the middle plate 108a are separated and fed one by one by the function of the feeding roller 109 and a separating nail so as to be guided to a transporting roller 110.

The image forming part comprises a photosensitive drum 112, a developing device 114, a transfer charging device 115, and a separation charging device 116. The photosensitive drum 112 has an image light beam by a laser scanner (not shown) based on the image data read out by a reader part 150 so that an electrostatic latent image is formed on the surface of the photosensitive drum 112. The electrostatic latent image is converted to a toner image by the developing device 114 so as to be transferred by the transfer charging device 115 onto the sheet fed by the resist roller 106. The sheet with the toner image transferred is separated from the photosensitive drum 112 by the separation charging device 116 so as to be fed to a conveying belt 117.

Thereafter, the sheet is fed by the conveying belt 117 to a fixing unit 118 so as to have the toner image fixed by the fixing unit 118. Then, it is fed to a diverter 120 by a transporting roller 119. The sheet fed to the diverter 120 is guided to a discharging roller 121 by the diverter 120 so as to be fed into a sorter 122.

The sorter 122 comprises a non sort tray 122a, a sort bin tray 122b, a non sort tray discharging roller 122c, and a sort bin tray discharging roller 122d such that the non sort tray 122a and the sort bin tray 122b are elevated for classifying the sheets for each stage. Instead of the sorter, a finisher having the function of a stapler or a puncher, or a discharging tray may be mounted.

In the case where of double side copying or multiple copying, the sheet fed to the diverter 120 is classified by the diverter 120 so as to be fed to a transporting roller 201. Then, in the case where of double side copying, the sheet is inverted via a belt 202, a diverter 203, a belt 204, a path 206 and a discharging roller 205 so as to be discharged to an intermediate tray 200. Moreover, in the case where of multiple copying, the sheet is discharged as it is to the intermediate tray 200 via the belt 202 and the diverter 203.

The sheet discharged to the intermediate tray 200 is fed by half moon rollers 209, 210, separated one by one by a separation roller pair 211, fed to the resist roller 106 by conveying rollers 213, 214, 215, processed to have double side copying or multiple copying at the image forming part and discharged to the sorter 122 as mentioned above.

(Explanation of the Image Reading Unit)

As shown in FIG. 1, the image reading unit 15 comprises a reader part 150 and a document feeding unit 2 (ADF (auto document feeder)) as the document feeding device provided above the reader part 150.

(Explanation of the Reader Part)

The reader part 150 comprises a lamp 152 and a mirror 153 as the image reading device, mirrors 165, 156, a lens 157, and a CCD 158. The lamp 152 and the mirror 153 are attached to an optical stand 159.

Moreover, the optical stand 159 is coupled with a motor 314 (see FIG. 10) by a wire (not shown) so as to be moved and controlled parallel to the document stand glass 3 by the rotation drive of the motor 314.

A position sensor 315 (see FIG. 10), which is a sensor for detecting the home position of the optical stand 159, moves the optical stand 159 by rotating the motor 314 forwardly or backwardly with the position of the position sensor 315 provided as the reference for scanning optically the document on the document stand glass 3.

Moreover, the motor 314 comprises a stepping motor. The motor 314 is connected with an encoder 302 such that for how many pulses the optical stand 159 has been moved can be recognized by the output of the encoder 302. That is, according to the positions sensor 315 and the encoder pulses from the encoder 302, the position of the optical stand 159 can be grasped.

A light beam directed from the lamp 152 to the document surface is reflected by the document P. The light beam reflected by the document is guided to the lens 157 via the mirrors 153, 155, 156 so as to be collected onto the CCD 158 by the lens 157. The CCD 158 photo-electrically converts the reflected light beam, reflecting the document information so as to output the same as an electronic image signal.

According to the configuration, the reader part 150 reads the document information by two modes including the ADF document reading mode and the document stand glass document reading mode. The ADF document reading mode is a mode for reading the document information while feeding the document by the ADF 2 with the optical stand 159 stopped at the document reading position 160 (the position shown by the chain line shown in FIG. 1). The document stand glass document reading mode is a mode for reading the document information with the document placed still on the document stand glass 3 while moving the optical stand 159 in the sub scanning direction orthogonal to the scanning direction (document width direction).

As shown in FIG. 10, a scanner controller 304 for controlling the reader part 150 is connected with the motors 314, 302, the lamp 152, a position sensor 315 for positioning the optical stand 159 at the home position, the lamp 152 for directing a light beam to the document surface, the CCD 158, an A/D converting circuit 301, and a backup RAM 303 for controlling the operation thereof. The backup RAM 303 is a memory for setting the standard document reading position 160 in the ADF document reading mode.

(Explanation of the Document Feeding Unit)

As shown in FIG. 1, the document feeding unit 2 (ADF) comprises the document tray 4, the feeding part, the separating part (the feeding roller 5, the separating pad 6, and the separation conveying roller 8), the transporting part (the resist driven roller 11, the resist roller 12, the lead discharging roller 23, the lead discharging driven roller 16), the discharging part (discharging roller 18, the discharging tray 10), various kinds of driving systems and sensors, the control circuit, and hinge mechanisms 95, 96.

The feeding part and separating part comprise the feeding roller 5, the separating pad 6 and the separation conveying roller 8. The document tray 4 is for piling sheet like documents P. In the document tray 4, a pair of width direction limiting plates 44 for limiting the document width direction is disposed slidably in the document width direction. By limiting the width direction of the document P piled on the document tray 4 by the width direction limiting plates 44, the feeding stability can be ensured in the feeding operation.

The feeding roller 5 is provided above the document tray 4. The feeding roller 5 is rotated according to the rotation drive of the separation conveying roller 8 so as to feed the sheet document. Since the feeding roller 5 is pivoted by an unshown arm, the feeding roller 5 can be moved vertically by swaying the arm. The feeding roller 5 in general is disposed at a position withdrawn above as the home position (the solid line position in FIG. 1) without disturbing the document setting operation. In the case where the feeding operation is started, the feeding roller 5 is lowered so as to come in contact with the upper surface of the document P (the dotted line position in FIG. 1).

The separating pad 6 is disposed on the side facing the separation transporting roller 8 so as to apply the pressure to the separation transporting roller 8 side. The separating pad 6 is made of a rubber material having a friction slightly smaller than that of the separation transporting roller 8. The resist roller 12 and the resist driven roller 11 provide the resist means for offsetting the top end of the documents fed by the separation conveying roller 8.

(Driving System)

FIG. 3 is a diagram showing the driving system including the motor and the solenoids for driving the rollers, or the like. A separation solenoid 57 drives the sway of the feeding roller 5. The separation solenoid 57 lifts up and supports the feeding roller 5 above as the home position (the solid line position in the figure) for supporting the same at a position without disturbing at the time of setting the documents as a keep solenoid. At the time of the feeding operation, the keeping force of the solenoid 57 is turned off so as to lower the same for pressuring the uppermost paper of the sheet documents on the document tray 4 by the feeding roller 5.

A separation motor 51 is a stepping motor for rotating and driving the separation roller 8 and the feeding roller 5 in the feeding direction. A lead motor 53 is a stepping motor for driving the resist roller 12, the lead roller 22, the platen roller 24 and the lead discharging roller 23. The lead motor 53 drives the rollers at a speed capable of reading out the image on the document to be fed. A discharging motor 50 is a stepping motor for driving the discharging roller 18.

(Sensor)

The document tray 4 is provided with a document set detecting sensor 40 as a transmission type optical sensor for detecting the setting of the sheet document P. Moreover, a paper width detecting sensor 41 for detecting the length in the width direction of the document bundle P set on the document tray 4 by detecting the position of the width direction limiting plate 44 is provided below the document tray 4.

The resist sensor 7 as the transmission type optical sensor for detecting the document is provided between the separation roller 8 and the resist roller 12 for detecting the top end of the document separated and fed and the timing for controlling the butting amount (loop amount) with respect to the resist roller 12, or the like. The lead sensor 13 as the reflection type optical sensor for detecting the document is provided immediately after the lead roller 22 for providing a reference signal for the image reading start timing at the document reading position 160. The discharging sensor 17 as the transmission type optical sensor for detecting the document is provided immediately before the discharging roller 18 for detecting the document discharging timing, or the like.

(Control Circuit)

As shown in FIG. 9, the control circuit of the document feeding unit 2 comprises mainly a micro processor 54 (CPU) such that drive circuits and sensor signals of various loads are connected with the input and output ports of the CPU 54.

Moreover, the control circuit comprises a RAM (not shown) to be backed up by a battery and a ROM (not shown) stored in a control sequence software. Moreover, the communication IC 55 controls the data communication with the printer part 300.

The separation motor 51, the lead motor 53 and the discharging motor 50 are driven by each stepping motor driver. A phase exciting signal and a motor electric current control signal are inputted from the CPU 54 to each driver. The separation solenoid 57 is driven by the driver such that the operation thereof is controlled by the signal connected with the input and output ports of the CPU 54.

The various sensors including the resist sensor 7, the set sensor 40, the lead sensor 13, the discharging sensor 17, the document width sensor 41, or the like are connected with the input port of the CPU 54 so as to be used for monitoring the behavior of the document and the behavior of the moving load in the apparatus.

(Explanation of the Document Feeding Operation)

In the case where the document P on the document tray 4 is detected by the document set sensor 40, the feeding roller 5 is lowered so as to come in contact with the document bundle. In the case where the copying conditions are inputted by the operation part of the image forming apparatus 1 and the start key is pressed, the document size is detected by the document width sensor 41 on the document tray 4. Furthermore, the support of the separation solenoid 57 is released so that the document is fed to the downstream part (separation transporting roller 8) while receiving the feeding force of the feeding roller 5, separated one by one by the separating pad 6 and the separation transporting roller 8 so as to be fed to the resist driven roller 11 and the resist roller 12.

The document P separated and fed by the separation transporting roller 8 is looped so as to have the top end offset by having the rear end fed by the separation transporting roller 8 while butting the document top end against the nip part of the resist roller pair 11, 12 remaining still.

The document P with the top end offset is fed toward the lead roller 22, the lead driven roller 14 and the platen roller 24. At the time, the image is read out with the document P slid against and guided by the surface of the flow reading platen 161 (document glass) as the transparent document guide provided between the platen roller 24 and the mirror 153, or the like. The document P with the image read by the flow reading platen 161 is taken up from the flow reading platen 161 by a jump stand 162 so as to be fed to the discharging roller 18 by the lead discharging roller 23 and the lead discharging driven roller 16 and discharged to the discharging tray 10.

At the time of the double side reading mode, the document P is switched back by the discharging roller 18 so as to be guided to the sheet path 19 provided above for being fed to the resist rollers 11, 12. After being fed to the resist rollers 11, 12, the reading operation is executed for the rear surface of the document in the same manner as mentioned above, and it is discharged to the discharging tray 10.

(Hinge Mechanism)

As shown in FIGS. 5 to 8, the document automatic feeding unit 2 is provided openably/closably with respect to the platen glass 161 and the document stand glass 3 by the hinge mechanisms 95, 96. As shown in FIG. 5, the hinge mechanisms 95, 96 are stored on the right and left side inside the casing 52. When it is viewed from the rear side of the document feeding unit 2, the hinge mechanism 95 is disposed on the left side and the hinge mechanism 96 is disposed on the right side.

As shown in FIGS. 6 and 7, the hinge mechanisms 95, 96 support the document automatic feeding unit 2 openably/closably with respect to the reader part 150 around the hinge shaft 71. The hinge mechanisms 95, 96 comprise a lift arm 74, a lift shaft 75, a lower spring shaft 76, a hinge arm 77, a height adjusting screw 78, a fulcrum shaft 71, a hinge base 84, a lower spring holder 85, a compression spring 86, an upper spring holder 87, an upper spring shaft 88, or the like.

The hinge base 84 is fixed on the main body of the reader part 150. The hinge arm 77 is provided rotatably on the hinge base 84 via the fulcrum shaft 71.

The hinge arm 77 supports the lift arm 74 rotatably via the lift shaft 75. The height adjusting screw 78 is screwed into the lift arm 74 such that the top end of the height adjusting spring 78 comes in contact with a part of the hinge arm 77 for adjusting the height of the document automatic feeding unit 2 with respect to the document stand glass 3.

The lift arm 74 is fixed on the casing 52. The upper spring holder 87 supports one end of the compression spring 86. The upper spring holder 87 is provided rotatably on the lift arm 76 via the upper spring shaft 88. The lower spring holder 85 supports the other end of the compression spring 86. The lower spring holder 85 is fixed rotatably on the hinge base 84 via the lower spring shaft 76. Therefore, according to the switching operation of the document automatic feeding unit 2, the interval between the upper spring shaft 88 and the lower spring shaft 76 is changed so that the compression spring 16 is stretched or contracted.

The casing 52 has an opening part 93 formed by notching the casing 52 at a position on the rear side corresponding to the hinge mechanisms 95, 96. The opening parts 93 function as the escape of the hinge mechanisms 95, 96 such that the hinge mechanisms 95, 96 are projected form the opening parts 93 to the rear side at the time the document automatic feeding unit 2 is rotated so as to be fully opened.

The opening parts 93 has the rear side covered by a hinge mechanism protection cover 89. The hinge mechanism protection cover 89 is for covering so as to prevent entrance of foreign matters into the hinges. Moreover, guard plates 90, 91, 92 guard the hinge mechanisms 95, 96 so as not to damage the hinge mechanisms 95, 96 even in the case where an external force is applied by the contact with the wall, the projecting substances, or the like at the time of conveyance.

The hinge mechanism protection cover 89 has a part of the upper end fixed to the casing 52. The hinge mechanism protection cover 89 is made of an EPDM (ethylene propylene rubber) based rubber sheet, and thus it can be shaped easily. Moreover, the hinge mechanism protection cover 89 is bent feely by the elastic force and it returns to the original shape by its self weight.

The guard plates 90, 91, 92, which are shaped with an ABS (acrylonitrile butadiene styrene three component copolymer), are fixed to the hinge mechanism protection cover 89. The guard plates 90, 91, 92, which can hardly be deformed, cannot be detached form the hinge mechanism protection cover 89 even in the case where the hinge mechanism protection cover 89 is deformed.

FIG. 6 shows the state with the document automatic feeding unit 2 half opened. At the time, the document automatic feeding unit 2 can be switched in the arrow B direction with respect to the copying machine main body 1. FIG. 7 shows the state with the document automatic feeding unit 2 fully opened. At the time, the compression spring 86 is stretched. Therefore, at the time of closing the document automatic feeding unit 2, it can be closed by a small force. Accordingly, the hinge mechanisms 95, 96 facilitate the switching operation of the document automatic feeding unit 2 by the stretch of the compression spring 86 according to the switching operation of the document automatic feeding unit 2.

FIG. 8 shows the state with the lift arm 74 rotated with respect to the hinge arm 77 so that the white pressure plate 94 and the document automatic feeding unit 2 are equalized parallel to the document stand glass 3 (the state with the gap between the white pressure plate 94 and the document stand glass 3 having a constant height). At the time, the compression spring 86 is compressed so as to facilitate the opening operation of the document automatic feeding unit 2.

(Document Reading Part)

As shown in FIG. 4B, the document reading part comprises the platen roller 24 and the flow reading platen 161.

The platen roller 24 comprises a white platen roller 24a, and a sheet press roll 24b as the sheet limiting roll. The white platen roller 24a is driven and rotated in the direction of feeding the document P by unshown driving means. The interval between the white platen roller 24a and the flow reading platen 161 is ensured to be 0.15 mm by unshown glass butting means. The sheet press roll 24b is rotated, following the white platen roller 24a, and the interval between the sheet press roll 24b and the flow reading platen 161 is ensured to be 0.5 mm.

The flow reading platen 161 has the EC coating (transparent conductive coating) on the glass surface, and its surface resistance ratio is 200 to 500 $\Omega$/cm.

An aluminum sheet 161a as the conductive member is attached from the front surface to the rear surface of the flow reading platen 161 by a conductive double side adhesive tape at the upstream side end part in the document feeding direction of the flow reading platen 161. The aluminum sheet 161a ensures the conduction between the flow reading platen 161 surface and the grounded housing 150a.

As shown in FIG. 4A, the aluminum sheet 161a is contacted with the flow reading platen 161 in the vicinity of the document reading position 160 on the document-feeding direction upstream side with respect to the document reading position 160, outside the area with the document P come in contact with the flow reading platen 161 and in the substantially entire area in the document width. Moreover, the aluminum sheet 161a has the longitudinal direction (document width direction) length X set by the maximum document width to be fed or more and the document feeding direction length Y orthogonal to the document width direction set so as not to be on the contact position Z with the document come in contact with the transparent document guide.

By attaching the aluminum sheet 161 by the attaching conditions, the static electricity resulting from the friction between the document P and the flow reading platen 161 can be eliminated instantly without the adverse effect for the document feeding operation.

The aluminum sheet 161a is protected by a resin sheet 161b as the protection member. By protecting the aluminum sheet 161a by the resin sheet 161b, inadvertent detachment of the aluminum sheet 161a by the user can be prevented.

The resin sheet 161b does not cover the entirety of the aluminum sheet 161a, but it covers the same so as to expose the aluminum sheet 161a by about 1 to 2 mm. Thereby, only the top end of the aluminum sheet 161a comes in contact with the document P so that the charge of the document P can be eliminated at the top end of the aluminum sheet 161a. That is, by eliminating not only the charge of the flow reading platen 161 but also the charge of the document P, the charge eliminating effect of the flow reading platen 161 can be improved.

The dust G such as the paper dust adhered on the document P are conveyed with the document P so as to be slid between the flow reading platen 161 and the document P. Since the charge on the surface of the flow reading platen 161 is eliminated instantly by the aluminum sheet 161a, the electrostatic vacuuming force is not applied among the document P, the dust G and the flow reading platen 161 so that the frictional force becomes dominant. Therefore, the frictional force between the document P and the dust G is stronger than the frictional force between the ducts G and the flow reading platen 161 so that the dust G are fed with the document P so as to prevent occurrence of the image striped derived from the stagnation thereof at the flow reading platen 161.

Moreover, even in the case where the dust G remain on the flow reading platen 161, since they can be eliminated easily by being cleaned by the top end of the following document P if they are not vacuumed electrostatically, occurrence of the striped image can be prevented.

Although the conductive member in this embodiment is the aluminum sheet 161a attached by the conductive double side adhesive tape, the present invention is not limited thereto, and it may be a copper, or the like. Furthermore, it may be a conductive tape directly attached on the flow reading platen 161. Moreover, the conductive member may be a plate spring.

As mentioned above, according to the configuration with the aluminum sheet 161a provided conductive with the flow reading platen 161 on the document feeding direction upstream side with respect to the document reading position 160 and in the substantially entire area of the document width, the charge can be eliminated in the vicinity of the friction part between the flow reading platen 161 and the document P (static electricity generating area) so that the charge can be eliminated sufficiently in a short time by restraining the influence by the size of the surface resistance of the flow reading platen 161. Thereby, the electrostatic vacuuming of the flow reading platen 161 and the document P can be prevented so as to prevent occurrence of the stripe image.

Moreover, since the aluminum sheet 161a is provided on the document feeding direction upstream side with respect to the contact position Z of having the document P come in contact with the flow reading platen 161, the charge of the document P can be eliminated directly by the contact of the aluminum sheet 161a with the document P.

Other Embodiments

Next, other embodiments of the image reading unit according to the present invention and the image forming apparatus comprising the same will be explained with reference to the drawings. FIG. 11 is a detailed diagram of an image reading unit according to another embodiment. The same numerals are applied to the parts already explained in the first embodiment and the explanation is not be repeated here.

As shown in FIG. 11, the image reading unit according to this embodiment and the image forming apparatus comprising the same has the length of the aluminum sheet 161a of the first embodiment set at the same length of the flow reading platen 161 in the document width direction, and furthermore, it is provided also on the both sides of the document width direction rim part of the flow reading platen 161. That is, the aluminum sheet 161 and the protection sheet 161b are provided on the three sides of the flow reading platen 161.

As in the first embodiment, the aluminum sheet 161a is set so as not to be on the contact position Z of the flow reading platen 161. Moreover, the aluminum sheet 161a is covered with the resin sheet 161b so as to expose the aluminum sheet 161a by about 1 to 2 mm.

Accordingly, since the aluminum sheet 161a and the protection sheet 161b are provided on the three sides (the upstream side rim part in the document feeding direction of the document reading position 160 and the both sides of the document width direction rim part) of the flow reading platen 161, the charge eliminating range is expanded so that the charge is eliminated from the part other than the friction area of the document P and the flow reading platen 161, the static electricity occurred by the friction between the document P and the flow reading platen 161 can be eliminated instantly without the adverse effect on the document feeding operation, and thus occurrence of the image stripes derived from electrostatic vacuuming of the dust G on the flow reading platen 161 can further be restrained.

As heretofore explained, since the conductive member aluminum sheet 161a is conductive with the flow reading platen 161 on the document feeding direction upstream side with respect to the image reading position and in the substantially entire document width, the charge can be eliminated in the vicinity of the friction part of the flow reading platen 161 and the document (static electricity generating area), the charge can be eliminated sufficiently in a short time by restraining the influence by the size of the surface resistance of the flow reading platen 161. Thereby, the electrostatic vacuuming of the flow reading platen 161 and the document P can be prevented so as to prevent occurrence of the stripe image.

Moreover, since the conductive member aluminum sheet 161a is provided on the document feeding direction upstream side with respect to the position of having the document come in contact with the flow reading platen 161, the charge of the document P can be eliminated as well.

Furthermore, according to the configuration of having the conductive member aluminum sheet 161a provided on the document feeding direction upstream side rim part of the flow reading platen 161 and the document width direction rim part of the flow reading platen 161, the charge eliminating operation can be executed sufficiently so that the occurrence of the image stripes can further be restrained.

This application claims priority from Japanese Patent Application no. 2003-417606, filed Dec. 16, 2003, which is hereby incorporated by reference herein.

What is claimed is:

1. An image reading apparatus comprising;
   an image reading device configured to read an image of a document,
   a document feeding device configured to feed the document to the image reading device,
   a transparent document guide provided between the image reading device and the document feeding device, and configured to guide the document while sliding the document against the surface of the transparent document guide,
   a conductive member, fixed on the transparent document guide, configured to ground the transparent document guide, and
   a protective member provided between the transparent document guide and a document feeding path of the document feeding device, and configured to cover at least a part of the conductive member so as to protect the conductive member.

2. The image reading apparatus according to claim 1,
   wherein the conductive member is a conductive sheet and is fixed below a sheet regulating roller pressing the document on the transparent document guide and in upstream side of contacting position of the document with the transparent document guide in a document conveyance direction,
   wherein the protective member covers the conductive member so that an end portion of the conductive member on a side of an image reading position of the image reading device is exposed.

3. The image reading apparatus according to claim 2,
   wherein the conductive member is provided in the document conveyance direction upstream side rim part of the transparent document guide and a document width direction rim part of the transparent document guide.

4. The image reading apparatus according to claim 1,
   wherein the conductive member is a conductive tape made of an aluminum or a copper, and it is attached directly on the transparent document guide.

5. The image reading apparatus according to claim 1,
   wherein the conductive member is a plate spring.

6. The image reading apparatus according to claim 1,
   wherein the transparent document guide is an document glass and is coated with transparent conductive coat on a surface.

7. The image reading apparatus according to claim 2,
   wherein the document feeding device comprises a white platen roller and the sheet regulating roller such that the document is fed to the transparent document guide by the white platen roller and the sheet regulating roller.

8. The image reading apparatus according to claim 1,
   wherein the image reading device stays at a predetermined position so as to execute flow reading of reading an image while feeding the document.

9. The image reading apparatus according to claim 1,
   wherein the transparent document guide is a document glass with the transparent conductive coating applied on the surface.

10. An image forming apparatus comprising,
    the image reading apparatus according to claim 1, and
    an image forming part for forming an image on a recording medium according to the image read out by the image reading apparatus.

* * * * *